US012627411B2

(12) United States Patent　　(10) Patent No.: US 12,627,411 B2
Yu et al.　　(45) Date of Patent: May 12, 2026

(54) DATA TRANSMISSION

(71) Applicant: Nokia Technologies Oy, Espoo (FI)

(72) Inventors: Ling Yu, Kauniainen (FI); Ping-Heng Kuo, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 527 days.

(21) Appl. No.: 18/246,908

(22) PCT Filed: Sep. 2, 2021

(86) PCT No.: PCT/EP2021/074236
　　§ 371 (c)(1),
　　(2) Date: Mar. 28, 2023

(87) PCT Pub. No.: WO2022/073701
　　PCT Pub. Date: Apr. 14, 2022

(65) Prior Publication Data
　　US 2023/0412309 A1　　Dec. 21, 2023

(30) Foreign Application Priority Data

Oct. 9, 2020　　(EP) .................................... 20201026

(51) Int. Cl.
　　*H04L 1/1806*　　(2023.01)
　　*H04L 1/00*　　(2006.01)
　　*H04L 1/08*　　(2006.01)
(52) U.S. Cl.
　　CPC .......... *H04L 1/1806* (2013.01); *H04L 1/0041* (2013.01); *H04L 1/007* (2013.01); *H04L 1/08* (2013.01)

(58) Field of Classification Search
　　CPC ..... H04L 1/1806; H04L 1/0041; H04L 1/007; H04L 1/08
　　See application file for complete search history.

(56) References Cited

U.S. PATENT DOCUMENTS 6,076,114 A　　6/2000　Wesley
11,811,540 B2 *　11/2023　Li ......................... H04L 1/1893
　　(Continued)

FOREIGN PATENT DOCUMENTS

CN　　　1957576 A　　5/2007
CN　　102694631 A　　9/2012
　　(Continued)

OTHER PUBLICATIONS

Office action received for corresponding Indian Patent Application No. 202347031071, dated Mar. 12, 2024, 6 pages.
　　(Continued)

*Primary Examiner* — Oussama Roudani
(74) *Attorney, Agent, or Firm* — Carter, DeLuca & Farrell LLP

(57) ABSTRACT

An apparatus comprising means for: determining at least one expected arrival sequence of one or more expected data units to be transmitted over at least one network system; determining if at least one of the one or more expected data units does not arrive for transmission over the at least one network system as expected; and if it is determined that at least one of the one or more expected data units does not arrive for transmission over the at least one network system as expected, increasing transmission reliability of one or more data units adjacent to at least one expected data unit that has not arrived for transmission over the at least one network system as expected.

1 Claim, 4 Drawing Sheets

(56) References Cited

U.S. PATENT DOCUMENTS

| | | | | |
|---|---|---|---|---|
| 2003/0219005 | A1* | 11/2003 | Isnard | H04W 56/002 370/350 |
| 2004/0215812 | A1 | 10/2004 | Lu | |
| 2008/0219189 | A1* | 9/2008 | Kitchin | H04L 12/1863 370/277 |
| 2010/0246472 | A1* | 9/2010 | Wu | H04L 1/1887 370/315 |
| 2010/0318869 | A1* | 12/2010 | Kashima | H04L 1/1812 714/776 |
| 2011/0154146 | A1* | 6/2011 | Shin | H04L 1/1832 714/749 |
| 2013/0176864 | A1 | 7/2013 | Quan et al. | |
| 2019/0036644 | A1 | 1/2019 | Wikstrom et al. | |
| 2019/0158410 | A1 | 5/2019 | Bush | |
| 2019/0280824 | A1 | 9/2019 | Werner et al. | |
| 2024/0259165 | A1* | 8/2024 | Seok | H04L 5/0055 |

FOREIGN PATENT DOCUMENTS

| | | | |
|---|---|---|---|
| CN | 104160775 | A | 11/2014 |
| CN | 104885409 | A | 9/2015 |
| CN | 108377427 | A | 8/2018 |
| CN | 111525983 | A | 8/2020 |
| GB | 2571260 | A | 8/2019 |
| JP | 2001111560 | A | 4/2001 |
| JP | 2003078480 | A | 3/2003 |
| JP | 2004147183 | A | 5/2004 |
| JP | 2013062776 | A | 4/2013 |
| JP | 2013225761 | A | 10/2013 |
| JP | 2017011534 | A | 1/2017 |
| WO | 2005/112382 | A1 | 11/2005 |
| WO | 2021/028032 | A1 | 2/2021 |
| WO | 2021/064287 | A1 | 4/2021 |
| WO | 2022/017577 | A1 | 1/2022 |
| WO | 2022/022835 | A1 | 2/2022 |

OTHER PUBLICATIONS

Office Action received for corresponding Japanese Patent Application No. 2023-521537, dated Jun. 13, 2024, (5 pages), English summary and translation (10 pages), 15 total pages.
Office Action received for corresponding Japanese Patent Application No. 2023-521537, dated Dec. 10, 2024, 3 pages of Office Action and 2 pages of summary available.
"3rd Generation Partnership Project; Technical Specification Group Radio Access Network; NR; Packet Data Convergence Protocol (PDCP) specification (Release 16)", 3GPP TS 38.323, V16.1.0, Jul. 2020, pp. 1-40.
"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.
"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.
"3rd Generation Partnership Project; Technical Specification Group Services and System Aspects; Service requirements for cyber-physical control applications in vertical domains; Stage 1 (Release 17)", 3GPP TS 22.104, V17.3.0, Jul. 2020, pp. 1-76.
"Survival time triggered PDCP duplication", 3GPP TSG-RAN WG2 Meeting #105bis, R2-1903142, Agenda: 11.7.4, CATT, Apr. 8-12, 2019, pp. 1-3.
"Details of Selective Duplication Procedure", 3GPP TSG-RAN WG2 Meeting #105bis, R2-1904135, Agenda: 11.7.4, Lenovo, Apr. 8-12, 2019, pp. 1-3.
"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.
"3rd Generation Partnership Project; Technical Specification Group Services and System Aspects; Study on enhanced support of Industrial Internet of Things (IIoT) in the 5G System (5GS) (Release 17)", 3GPP TR 23.700-20, V0.4.0, Jun. 2020, pp. 1-56.
"TSN performance requirements evaluation", 3GPP TSG-RAN WG2 Meeting #103bis, R2-1814992, Agenda: 11.7.1. Nokia, Oct. 8-12, 2018, pp. 1-9.
Chen et al., "SDATP: An SDN-Based Traffic-Adaptive and Service-Oriented Transmission Protocol", IEEE Transactions on Cognitive Communications and Networking, vol. 6, No. 2, Jun. 2020, pp. 1-15.
"Providing Survival Time for Time Sensitive Communication to RAN", SA WG2 Meeting #136AH, S2-2000702, Agenda: 8.10, Huawei, Jan. 13-17, 2020, pp. 1-2.
"5G-TSN integration meets networking requirements for industrial automation", Ericsson, Retrieved on Apr. 21, 2023, Webpage available at : https://www.ericsson.com/en/reports-and-papers/ericsson-technology-review/articles/5g-tsn-integration-for-industrial-automation.
Extended European Search Report received for corresponding European Patent Application No. 20201026.0, dated Mar. 29, 2021, 12 pages.
International Search Report and Written Opinion received for corresponding Patent Cooperation Treaty Application No. PCT/EP2021/074236, dated Dec. 10, 2021, 14 pages.
Office action received for corresponding European Patent Application No. 20201026.0, dated Mar. 23, 2023, 8 pages.
Office Action received for corresponding Chinese Patent Application No. 202180069005.8, dated Feb. 28, 2025, 6 pages of Office Action and no page of translation available.
"RAN Enhancement for Survival Time", 3GPP TSG-RAN WG2 Meeting #112 Electronic, R2-2009759, Nokia, Agenda item: 8.5.4, Nov. 2-13, 2020, 3 pages.
Decision of Final Rejection received for corresponding Japanese Patent Application No. 2023-521537, dated Jun. 30, 2025, 2 pages of Decision of Final Rejection and no page of translation available.
Notice of Allowance received for corresponding Chinese Patent Application No. 202180069005.8, dated Aug. 18, 2025, 5 pages of Notice of Allowance and no page of translation available.

* cited by examiner

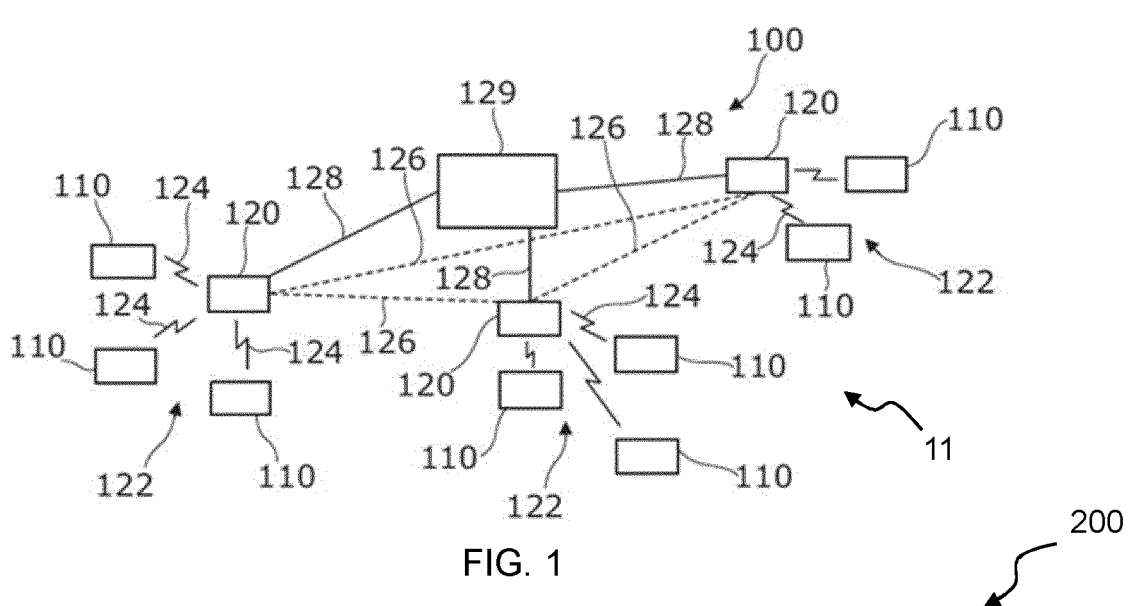

FIG. 1

| | |
|---|---|
| DETERMINING AT LEAST ONE EXPECTED ARRIVAL SEQUENCE OF ONE OR MORE EXPECTED DATA UNITS TO BE TRANSMITTED OVER AT LEAST ONE NETWORK SYSTEM | 202 |
| DETERMINING IF AT LEAST ONE OF THE ONE OR MORE EXPECTED DATA UNITS DOES NOT ARRIVE FOR TRANSMISSION OVER THE AT LEAST ONE NETWORK SYSTEM AS EXPECTED | 204 |
| IF IT IS DETERMINED THAT AT LEAST ONE OF THE ONE OR MORE EXPECTED DATA UNITS DOES NOT ARRIVE FOR TRANSMISSION OVER THE AT LEAST ONE NETWORK SYSTEM AS EXPECTED, INCREASING TRANSMISSION RELIABILITY OF ONE OR MORE DATA UNITS ADJACENT TO AT LEAST ONE EXPECTED DATA UNIT THAT HAS NOT ARRIVED FOR TRANSMISSION OVER THE AT LEAST ONE NETWORK SYSTEM AS EXPECTED | 206 |

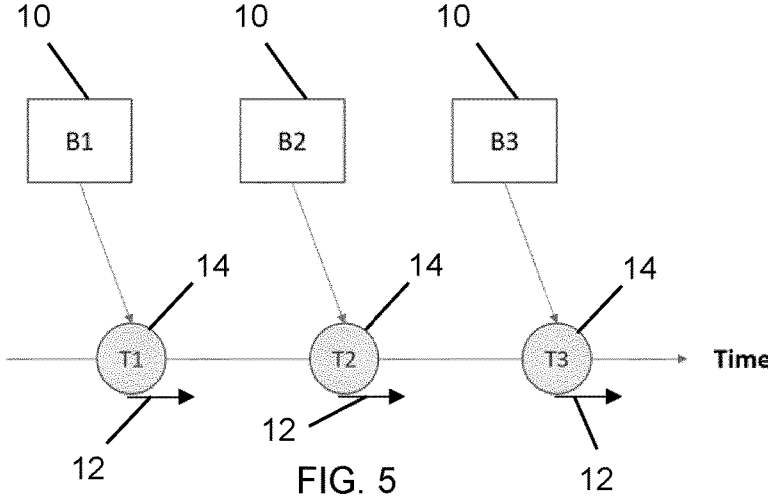
FIG. 5
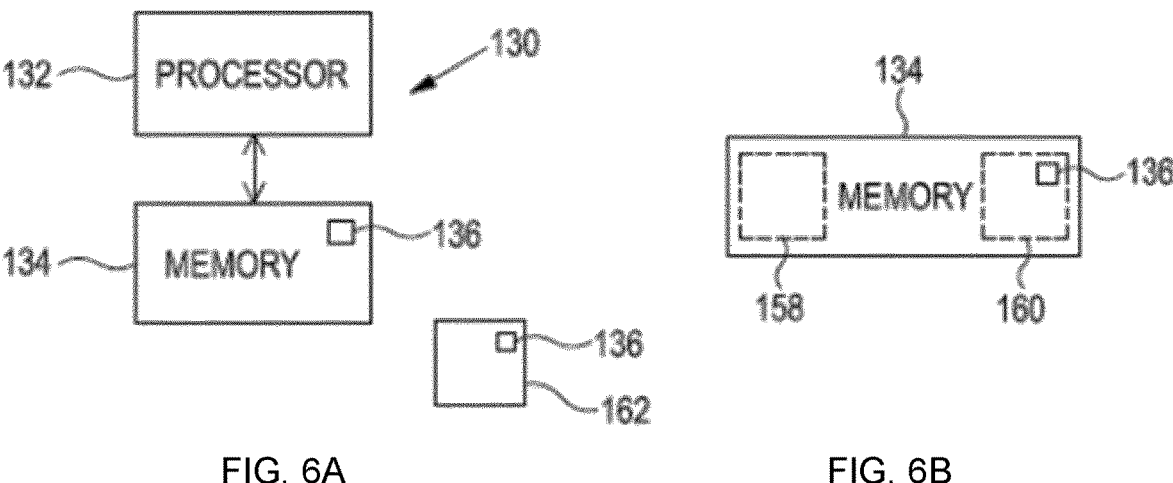
FIG. 6A                    FIG. 6B

DATA TRANSMISSION

RELATED APPLICATION

This application was originally filed as PCT Application No. PCT/EP2021/074236, filed on Sep. 2, 2021, which claims priority from EP Application Serial No. 20201026.0, filed on Oct. 9, 2020, each of which is incorporated herein by reference in its entirety.

TECHNOLOGICAL FIELD

Embodiments of the present disclosure relate to data transmission. Some relate to data transmission over a 5G radio access network

BACKGROUND

A wireless network comprises a plurality of network nodes including terminal nodes and access nodes. Communication between terminal nodes and access nodes is wireless.

In some circumstances, it may be desirable to increase transmission reliability of one or more data units across a network system, such as a wireless network.

BRIEF SUMMARY

According to various, but not necessarily all, embodiments there is provided examples as claimed in the appended claims.

According to various, but not necessarily all, embodiments there is provided an apparatus comprising means for:
determining at least one expected arrival sequence of one or more expected data units to be transmitted over at least one network system;
determining if at least one of the one or more expected data units does not arrive for transmission over the at least one network system as expected; and
if it is determined that at least one of the one or more expected data units does not arrive for transmission over the at least one network system as expected, increasing transmission reliability of one or more data units adjacent to at least one expected data unit that has not arrived for transmission over the at least one network system as expected.

In some examples, determining if at least one of the one or more expected data units does not arrive for transmission over the at least one network system as expected comprises:
determining if at least one of the one or more expected data units does not arrive within a time period of an associated expected arrival time; and/or
receiving one or more signals comprising information to notify that at least one of the one or more expected data units will not arrive for transmission over the at least one network system as expected; and/or
determining if at least one of the one or more expected data units has been received incorrectly.

In some examples, the means are configured to receive at least one value for the time period to be used in determining if at least one of the one or more expected data units does not arrive for transmission over the at least one network system as expected.

In some examples, the means are configured to:
determine a number, N, of consecutive expected data units that have not arrived for transmission over the at least one network system as expected;

and to at least one of:
increase transmission reliability of one or more data units adjacent to at least one expected data unit that has not arrived for transmission over the at least one network system as expected, if N is less than an upper limit; and
increase transmission reliability of one or more data units adjacent to at least one expected data unit that has not arrived for transmission over the at least one network system as expected, if N is greater than a lower limit.

In some examples, the means are configured to receive at least one upper limit value and/or at least one lower limit value.

In some examples, increasing transmission reliability of one or more data units adjacent to at least one expected data unit that has not arrived for transmission over the at least one network system as expected comprises at least one of:
retransmitting, over the network system, a received expected data unit preceding an expected data unit determined not to have arrived for transmission over the at least one network system as expected; and
transmitting with higher reliability, over the network system, a received expected data unit subsequent to an expected data unit determined not to have arrived for transmission over the at least one network system as expected.

In some examples, transmitting with higher reliability comprises transmitting the subsequent data unit using more reliable radio resources and/or more reliable radio mechanisms.

In some examples, the radio resource and/or the radio mechanism comprises at least one of:
one or more data radio bearer;
one or more component carrier;
one or more radio link control entities;
a type of grant used; and/or duplication.

In some examples, the means are configured to receive information for configuring the apparatus to transmit, with higher reliability, over the network system, the received expected data unit subsequent to the expected data unit determined not to have arrived for transmission over the at least one network system as expected.

In some examples, increasing transmission reliability of one or more data units comprises increasing transmission reliability of one or more data units based, at least in part, on N.

In some examples, the means comprises
at least one processor; and
at least one memory including computer program code,
the at least one memory and computer program code configured to, with the at least one processor, cause the performance of the apparatus.

According to various, but not necessarily all, embodiments there is provided a method comprising:
determining at least one expected arrival sequence of one or more expected data units to be transmitted over at least one network system;
determining if at least one of the one or more expected data units does not arrive for transmission over the at least one network system as expected; and
if it is determined that at least one of the one or more expected data units does not arrive for transmission over the at least one network system as expected, increasing transmission reliability of one or more data units adjacent to at least one expected data unit that has not arrived for transmission over the at least one network system as expected.

In some examples, determining if at least one of the one or more expected data units does not arrive for transmission over the at least one network system as expected comprises:

determining if at least one of the one or more expected data units does not arrive within a time period of an associated expected arrival time; and/or receiving one or more signals comprising information to notify that at least one of the one or more expected data units will not arrive for transmission over the at least one network system as expected; and/or determining that at least one of the one or more expected data units has been received incorrectly.

In some examples, the method comprises receiving at least one value for the time period to be used in determining if at least one of the one or more expected data units does not arrive for transmission over the at least one network system as expected.

In some examples, the method comprises:

determining a number, N, of consecutive expected data units that have not arrived for transmission over the at least one network system as expected;

and at least one of:

increasing transmission reliability of one or more data units adjacent to at least one expected data unit that has not arrived for transmission over the at least one network system as expected, if N is less than an upper limit; and increasing transmission reliability of one or more data units adjacent to at least one expected data unit that has not arrived for transmission over the at least one network system as expected, if N is greater than a lower limit.

In some examples, the method comprises receiving at least one upper limit value and/or at least one lower limit value.

In some examples, increasing transmission reliability of one or more data units adjacent to at least one expected data unit that has not arrived for transmission over the at least one network system as expected comprises at least one of:

retransmitting, over the network system, a received expected data unit preceding an expected data unit determined not to have arrived for transmission over the at least one network system as expected; and transmitting with higher reliability, over the network system, a received expected data unit subsequent to an expected data unit determined not to have arrived for transmission over the at least one network system as expected.

In some examples, transmitting with higher reliability comprises transmitting the subsequent data unit using more reliable radio resources and/or more reliable radio mechanisms.

In some examples, the radio resource and/or the radio mechanism comprises at least one of:

one or more data radio bearer;

one or more component carrier;

one or more radio link control entities;

a type of grant used; and/or duplication.

In some examples, the method comprises receiving information for configuring the apparatus to transmit, with higher reliability, over the network system, the received expected data unit subsequent to the expected data unit determined not to have arrived for transmission over the at least one network system as expected.

In some examples, increasing transmission reliability of one or more data units comprises increasing transmission reliability of one or more data units based, at least in part, on N.

According to various, but not necessarily all, embodiments there is provided a computer program comprising instructions for causing an apparatus to perform at least:

determining at least one expected arrival sequence of one or more expected data units to be transmitted over at least one network system;

determining if at least one of the one or more expected data units does not arrive for transmission over the at least one network system as expected; and if it is determined that at least one of the one or more expected data units does not arrive for transmission over the at least one network system as expected, increasing transmission reliability of one or more data units adjacent to at least one expected data unit that has not arrived for transmission over the at least one network system as expected.

In some examples, determining if at least one of the one or more expected data units does not arrive for transmission over the at least one network system as expected comprises:

determining if at least one of the one or more expected data units does not arrive within a time period of an associated expected arrival time; and/or receiving one or more signals comprising information to notify that at least one of the one or more expected data units will not arrive for transmission over the at least one network system as expected; and/or determining that at least one of the one or more expected data units has been received incorrectly.

In some examples, the computer program comprises instructions for causing an apparatus to perform receiving at least one value for the time period to be used in determining if at least one of the one or more expected data units does not arrive for transmission over the at least one network system as expected.

In some examples, the computer program comprises instructions for causing an apparatus to perform:

determining a number, N, of consecutive expected data units that have not arrived for transmission over the at least one network system as expected;

and at least one of:

increasing transmission reliability of one or more data units adjacent to at least one expected data unit that has not arrived for transmission over the at least one network system as expected, if N is less than an upper limit; and increasing transmission reliability of one or more data units adjacent to at least one expected data unit that has not arrived for transmission over the at least one network system as expected, if N is greater than a lower limit.

In some examples, the computer program comprises instructions for causing an apparatus to perform receiving at least one upper limit value and/or at least one lower limit value.

In some examples, increasing transmission reliability of one or more data units adjacent to at least one expected data unit that has not arrived for transmission over the at least one network system as expected comprises at least one of:

retransmitting, over the network system, a received expected data unit preceding an expected data unit determined not to have arrived for transmission over the at least one network system as expected; and transmitting with higher reliability, over the network system, a received expected data unit subsequent to an expected data unit determined not to have arrived for transmission over the at least one network system as expected.

In some examples, transmitting with higher reliability comprises transmitting the subsequent data unit using more reliable radio resources and/or more reliable radio mechanisms.

In some examples, the radio resource and/or the radio mechanism comprises at least one of:

one or more data radio bearer;

one or more component carrier;

one or more radio link control entities;

a type of grant used; and/or duplication.

In some examples, the computer program comprises instructions for causing an apparatus to perform receiving information for configuring the apparatus to transmit, with higher reliability, over the network system, the received expected data unit subsequent to the expected data unit determined not to have arrived for transmission over the at least one network system as expected.

In some examples, increasing transmission reliability of one or more data units comprises increasing transmission reliability of one or more data units based, at least in part, on N.

According to various, but not necessarily all, embodiments there is provided a computer program comprising instructions for causing an apparatus to perform at least a part of one or more methods as disclosed and/or described herein.

The description of a function and/or action should additionally be considered to also disclose any means suitable for and/or configured to perform that function and/or action/ BRIEF

DESCRIPTION

Some examples will now be described with reference to the accompanying drawings in which:

FIG. 1 shows an example of the subject matter described herein;

FIG. 2 shows another example of the subject matter described herein;

FIG. 5 shows another example of the subject matter described herein;

FIG. 6A shows another example of the subject matter described herein; and

FIG. 6B shows another example of the subject matter described herein.

DETAILED DESCRIPTION

Figure 4:
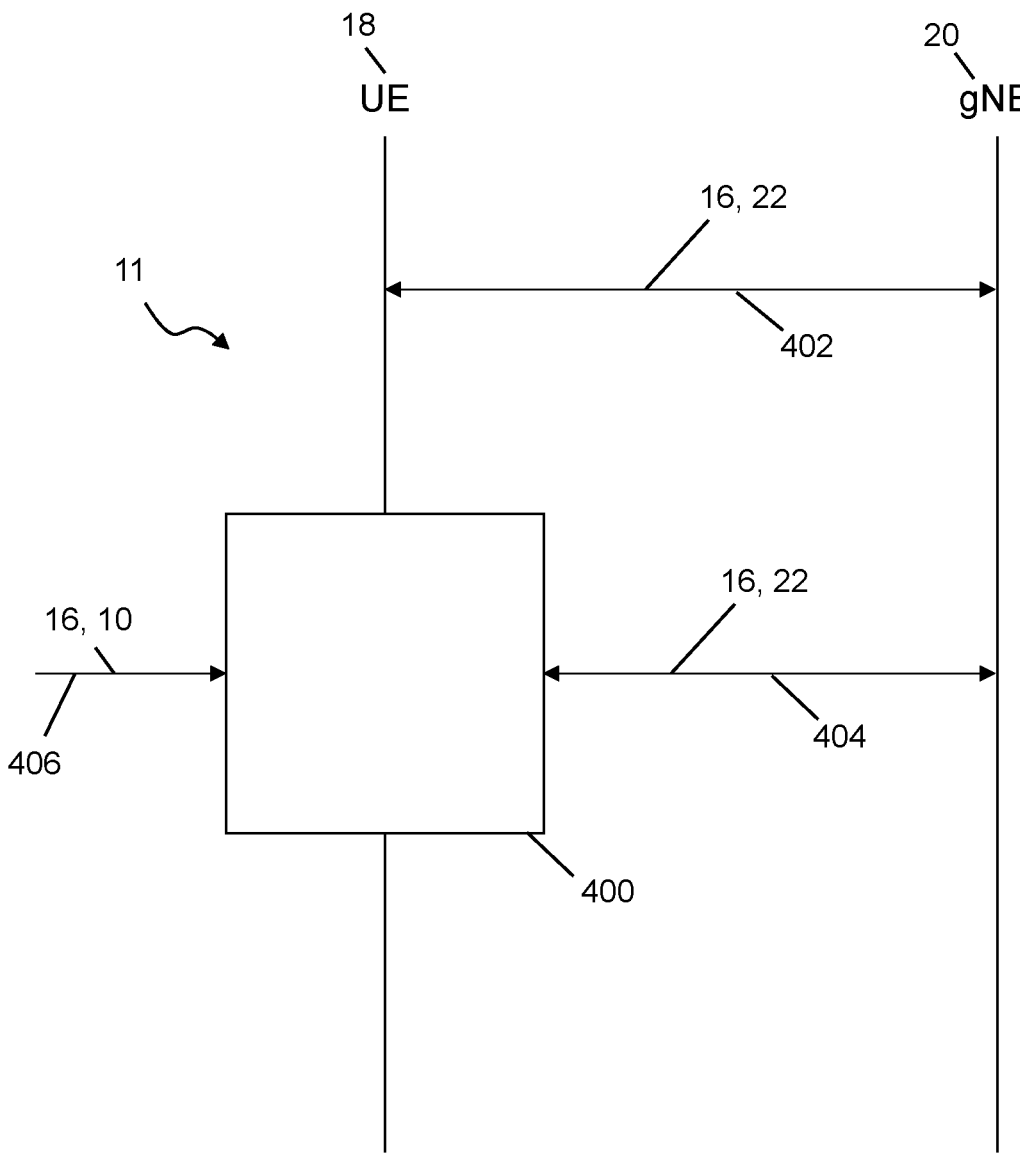
FIG. 4 shows another example of the subject matter described herein.

In the following, data units 10 is illustrated in FIG. 5 and FIG. 4, network systems 11 is illustrated in FIG. 1 and FIG. 4, time period 12 is illustrated in FIG. 5, arrival time 14 is illustrated in FIG. 5, signals 16 are illustrated in FIG. 4.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE, see, for example, FIG. 4) and the access nodes 120 are base stations (for example, gNBs).

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

In examples, the network 100 can comprise a combination of E-UTRAN and NG-RAN.

In some examples, the network 100 comprises and/or can be considered to comprise one or more network systems 11. In examples, one or more network systems 11 can be and/or comprise one or more NR or 5G radio access network (RAN) systems.

In examples, a radio access network comprises one or more base stations, such as gNBs, and one or more terminals, which can be mobiles, such as UEs.

Examples of the disclosure can apply to transmission of one or more received data units over and/or across and/or via at least one NR or 5G RAN system.

FIG. 2 illustrates an example of a method 200.

One or more of the features discussed in relation to FIG. 2 can be found in one or more of the other figures. See, for example, FIG. 4 and/or FIG. 5.

In examples, the method 200 can be performed by any suitable apparatus comprising any suitable means for performing the method 200. For example, an apparatus 130 as described in relation to FIGS. 6A and/or 6B.

In examples, the method 200 can be performed by a terminal node 110, such as a UE and/or an access node 120, such as a gNB. See, for example, FIG. 4.

At block 202 the method 200 comprises determining at least one expected arrival sequence of one or more expected data units 10 to be transmitted over at least one network system 11.

In examples the one or more expected data units 10 can be to be transmitted across at least one network system 11 and/or to be transmitted via at least one network system 11 and/or to be transmitted using at least one network system 11.

In some examples, transmitted over and/or across and/or via and/or using at least one network system 11 can be considered to comprise transmission using one or more nodes of the at least one network system 11.

In examples, the at least one network system 11 can be any suitable network system 11.

In some examples, the at least one network system 11 can be at least one portion of the network 100 of FIG. 1. For example, the at least one network system 11 can be at least one NR or 5G RAN system, at least one Ethernet system and/or at least one WiFi system and so on.

In examples, a data unit 10 comprises one or more signals, and/or one or more messages, and/or one or more packets and so on. A data unit 10 can comprise any suitable number of signals and/or messages and/or packets and so on.

That is, in examples, one or more signals, and/or one or messages, and/or one or more packets can be considered a data unit 10.

In some examples, a data unit 10 can be considered a burst and/or data and/or information.

In examples, an expected data unit 10 can be considered to be a data unit 10 that is expected to arrive at and/or be received by a node of a network 100 performing method 200, such as a UE or gNB.

In some examples, an expected data unit 10 can be considered to be a data unit 10 having an associated expected and/or scheduled arrival time 14 and/or reception time at a node of a network 100 performing method 200, such as a UE or gNB.

In examples, the one or more expected data units 10 can be at least part of a data and/or information traffic and/or flow.

In some examples, the one or more expected data units 10 are at least part of a data and/or information traffic and/or flow having deterministic and/or periodic nature.

For example, the one or more expected data units 10 can be at least part of a time-sensitive communication traffic and/or data flow.

In some examples, the one or more expected data units 10 can be considered to form at least part of a deterministic information and/or data traffic and/or flow.

In examples, the one or more expected data units 10 can be and/or can be considered to be from outside the at least one network system 11.

In some examples, the one or more expected data units 10 can be and/or can be considered to be from upstream of the at least one network system 11.

For example, the one or more expected data units 10 can be part of deterministic traffic, such as time-sensitive communication, expected to arrive at and/or be received by a network node, such as a UE or gNB, to be transmitted across at least one network system 11, such as at least one NR or 5G RAN system.

In examples, an expected arrival sequence of one or more expected data units 10 can have any suitable form and/or comprise any suitable information.

In some examples, an expected arrival sequence comprises a schedule of expected arrival times 14 for the one or more expected data units 10.

In some examples, an expected arrival sequence comprises information on periodicity of the one or more expected data units 10.

Any suitable method for determining at least one expected arrival sequence of one or more expected data units 10 to be transmitted over at least one network system 11 can be used.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In some examples, determining at least one expected arrival sequence of one or more expected data units 10 comprises receiving information of the expected arrival sequence of one or more expected data units 10 to be transmitted over at least one network system 11.

For example, a core network entity/function can provide time-sensitive communication assistance information (TS-CAI) to inform RAN of the traffic pattern of at least one traffic flow, which allows the RAN to determine at least one expected arrival sequence of one or more expected data units 10.

In examples, the one or more expected data units 10 are to be transmitted over the at least one network system 11 to any suitable destination or destinations. The destination(s) can, in examples, be one or more nodes that are part of the at least one network system 11 and/or one or more nodes that are outside of the at least one network system 11.

The one or more expected data units 10 can be transmitted for any suitable purpose. In some examples, the one or more expected data units 10 are to be transmitted over the at least one network system 11 for use by at least one application.

In such examples, an application can have an associated survival time, where survival time can be considered the time that an application consuming a communication service may continue without an anticipated data unit 10, which can be at least one message.

With regard to cyclic or deterministic traffic, survival time can be expressed as a maximum number of consecutive incorrectly received or lost data units 10, which can be at least one message, that an application can tolerate.

Therefore, if one or more of the one or more expected data units 10 do not arrive for transmission over the at least one network system 11 as expected and/or if one or more of the one or more expected data units 10 are lost in transmission over the at least one network system 11, this can cause a survival time failure.

At block 204, the method 200 comprises determining if at least one of the one or more expected data units 10 does not arrive for transmission over the at least one network system 11 as expected.

In some examples, determining if at least one of the one or more expected data units 10 does not arrive for transmission over the at least one network system 11 as expected can be considered determining if at least one of the one or more expected data units 10 is lost and/or goes missing and/or is dropped and/or is corrupted and/or is broken in upstream of the at least one network system 11.

In some examples, determining if at least one of the one or more expected data units does not arrive for transmission over the at least one network system 11 as expected can be considered determining if at least one of the one or more expected data units 10 is lost and/or goes missing and/or is dropped and/or is corrupted and/or is broken prior to reaching the at least one network system 11.

Any suitable method for determining if at least one of the one or more expected data units 10 does not arrive for transmission over the at least one network system 11 as expected can be used.

In examples, determining if at least one of the one or more expected data units 10 does not arrive for transmission over the at least one network system 11 as expected comprises determining if at least one expected data unit 10 does not arrive at an expected time and/or does not arrive in an expected condition and/or does not comprise expected information.

In some examples, determining if at least one of the one or more expected data units does not arrive for transmission over the at least one network system 11 as expected comprises: determining if at least one of the one or more expected data units does not arrive within a time period 12 of an associated expected arrival time 14 and/or receiving one or more signals 16 comprising information to notify that at least one of the one or more expected data units 10 will not arrive for transmission over the at least one network system 11 as expected; and/or determining if at least one or more expected data units 10 has been received incorrectly.

In examples, any suitable method to determine if at least one of the one or more expected data units 10 does not arrive within a time period 12 of an associated expected arrival time 14 can be used.

In some examples, a timer can be used to determine if the at least one of the one or more expected data units 10 does not arrive within a time period 12 of an associated expected arrival time 14. See, for example, FIG. 5, which illustrates an example of use of a time period 12.

This can therefore be understood with reference to FIG. 5.

FIG. 5 illustrates an example of an expected arrival sequence of one or more expected data units 10 to be transmitted over at least one network system 11.

In the example of FIG. 5, three data units 10 labelled B1, B2 and B3 are expected to arrive at times T1, T2 and T3 respectively.

That is, in the example of FIG. 5, data unit B1 has an associated expected arrival time T1, data unit B2 has an associated expected arrival time T2 and data unit B3 has associated expected arrival time T3.

In FIG. 5 the three data units 10 are part of periodic traffic to be delivered over a network system 11, such as a NR or 5G RAN system.

Also illustrated in the example of FIG. 5 are time periods 12 following the expected arrival times 14. The time periods 12 are illustrated by the arrows pointing to the right from the respective expected arrival times 14.

In the illustrated example, the time periods 12 are substantially the same. However, in examples, different time periods 12 can be used for one or more of the expected arrival times 14.

In the example of FIG. 5. If a data unit 10 does not arrive for transmission over at least one network system 11 within the associated time period 12, it is determined that the data unit 10 has not arrived for transmission over at least one network system 11 as expected.

For example, in FIG. 5, if data units B1 and B2 arrive within their respective time periods 12 but data unit B3 does not, it is determined that data units B1 and B2 have arrived for transmission over the at least one network system 11 as expected but data unit B3 has not arrived for transmission over the at least one network system 11 as expected.

In examples, data units 10 that do not arrive within the time period 12 can be considered missing and/or dropped and/or lost.

Any suitable time period 12 can be used. For example, time period(s) 12 in the range 2 milliseconds to 10 milliseconds can be used. In some examples, time period(s) 12 in the range 3.5 milliseconds to 7.5 milliseconds can be used. In some examples, time period(s) 12 of substantially 5 milliseconds can be used.

In examples, the value or values for the time periods 12 can be received. See, for example, FIG. 4.

Accordingly, in examples, method 200 comprises receiving at least one value for the time period 12 to be used in determining if at least one of the one or more expected data units 10 does not arrive for transmission over the at least one network system 11 as expected.

Any suitable method for receiving the at least one value for the time period 12 can be used. For example, receiving the at least one value for the time period 12 can comprise receiving one or more signals 16.

For example, in examples where method 200 is performed at a UE, the UE can receive one or more signals 16 comprising the at least one value for the time period 12 from a gNB.

In examples, any suitable method for receiving one or more signals 16 comprising information to notify that at least one of the one or more expected data units 10 will not arrive for transmission over the at least one network system 11 as expected can be used.

For example, any suitable signals 16 comprising any suitable information to notify and/or inform that a least one of the one or more expected data units 10 will not arrive for transmission over the at least one network system 11 as expected can be used.

In examples, the one or more signals 16 can originate and/or be transmitted from any suitable source via any number of intervening elements, including no intervening elements.

In some examples, the one or more signals 16 are received from a core network, such as a NR or 5G core network, and/or any other suitable system.

For example, a NR or 5G core network can determine that one or more data units 10 for transmission over the at least one network system 11 will not arrive as expected and transmit one or more signals 16 comprising information to a network node, such as a UE, performing method 200 to inform the network node of the missing data unit(s) 10.

In examples, any suitable method for determining if at least one of the one or more expected data units 10 has been received correctly can be used.

In some examples, determining if at least one expected data unit 10 has been received incorrectly can comprise analyzing and/or processing and/or checking at least one received data unit 10 to determine if the received data unit 10 is as expected and/or has been received correctly.

In some examples, determining if at least one expected data unit 10 has been received incorrectly can comprise determining if at least one data unit 10 arrives with information changed and/or missing and/or different than expected.

At block 206, the method 200 comprises, if it is determined that at least one of the one or more expected data units 10 does not arrive for transmission over the at least one network system 11 as expected, increasing transmission reliability of one or more data units 10 adjacent to at least one expected data unit 10 that has not arrived for transmission over the at least one network system 11 as expected.

Consequently, FIG. 2 illustrates a method 200 comprising:

determining at least one expected arrival sequence of one or more expected data units 10 to be transmitted over at least one network system 11;

determining if at least one of the one or more expected data units 10 does not arrive for transmission over the at least one network system 11 as expected; and if it is determined that at least one of the one or more expected data units 10 does not arrive for transmission over the at least one network system 11 as expected, increasing transmission reliability of one or more data units 10 adjacent to at least one expected data unit 10 that has not arrived for transmission over the at least one network system 11 as expected.

In examples, increasing transmission reliability of one or more data units 10 adjacent to at least one expected data unit 10 that has not arrived for transmission over the at least one network system 11 can be considered increasing transmission reliability of one or more data units 10 temporally adjacent to at least one expected data unit 10 that has not arrived as expected.

Additionally, or alternatively, increasing transmission reliability of one or more data units 10 adjacent to at least one expected data unit 10 that has not arrived for transmission over the at least one network system 11 as expected can be considered increasing transmission reliability of one or more data units 10 temporally adjacent to an expected arrival time 14 in which at least one expected data unit 10 did not arrive as expected.

That is, in examples, increasing transmission reliability of one or more data units 10 adjacent to at least one expected data unit 10 that has not arrived for transmission over the at least one network system 11 as expected can be considered increasing transmission reliability of one or more data units 10 adjacent to, in an expected arrival sequence, a scheduled/expected arrival time 14 in which at least one expected data unit 10 did not arrive as expected.

Additionally, or alternatively, increasing transmission reliability of one or more data units 10 adjacent to at least one expected data unit 10 that has not arrived for transmission over the at least one network system 11 as expected can be considered increasing transmission reliability of one or more data units 10 temporally adjacent to one or more expected arrival time slots in which at least one expected data unit 10 did not arrive as expected.

That is, in examples, increasing transmission reliability of one or more data units 10 adjacent to at least one expected data unit 10 that has not arrived for transmission over the at least one network system 11 as expected can be considered increasing transmission reliability of one or more data units 10 adjacent to, in an expected arrival sequence, a scheduled/expected arrival time slot in which at least one expected data unit 10 did not arrive as expected.

For example, in FIG. 5, if data unit B2 does not arrive at T2 as expected, data units B1 and B3 can be considered adjacent to the data unit 10 that has not arrived for transmission as expected.

Similarly, in FIG. 5, if data unit B3 does not arrive at T3 as expected, data unit B2 can be considered adjacent to the data unit 10 that has not arrived for transmission as expected.

Any suitable method for increasing transmission reliability of one or more data units 10 adjacent to at least one expected data unit 10 that has not arrived for transmission over the at least one network system 11 as expected can be used.

In examples, increasing transmission reliability of one or more data units 10 adjacent to at least one expected data unit 10 that has not arrived for transmission over the at least one network system 11 as expected comprises at least one of: retransmitting, over the network system 11, a received expected data unit 10 preceding an expected data unit 10 determined not to have arrived for transmission over the at least one network system 11 as expected; and transmitting with higher reliability, over the network system 11, a received expected data unit 11 subsequent to an expected data unit 10 determined not to have arrived for transmission over the at least one network 11 as expected.

Any suitable method for retransmitting, over the network system 11, a received expected data unit 10 preceding an expected data unit 10 determined not to have arrived for transmission over the at least one network system 11 can be used.

In examples, method 200 comprises storing a copy of data units 10 received as expected and retransmitting the stored copy as appropriate.

In some examples, a copy of the latest received data unit(s) 10 is stored.

In some examples, method 200 comprises retransmitting, over the network system 11, a received expected data unit 10 using one or more different radio resources and/or one or more different radio mechanisms.

Retransmission of an adjacent, preceding data unit 10 allows that data unit 10 to be transmitted at least twice and therefore enables time-domain duplication, which can reduce the error probability of the retransmitted data unit 10 and hence the probability of consecutive delivery failure of data units 10 over the at least one network system 11.

This can, for example, enable prevention of a survival time failure.

In the example of FIG. 5, data unit B1 could be retransmitted over the at least one network system 11 if data unit B2 is determined not to have arrived as expected.

In examples relating to third generation Partnership Project (3GPP) the packet data convergence protocol (PDCP) layer may store a copy of the PDCP protocol data unit (PDU) of the previous data unit(s).

If the next data unit(s) 10 is determined not to arrive as expected, the PDCP would submit the stored copy of the previous data unit(s) again to the lower layer.

The transmission of the previous data unit(s) 10 may be conducted on the same radio leg as the original transmission or on another radio leg if dual/multi-connectivity and/or carrier aggregation is activated for the PDCP entity.

In examples, any suitable method for transmitting with higher reliability, over the network system 11, a received expected data unit 10 subsequent to an expected data unit 10 determined not to have arrived as expected can be used.

In some examples, transmitting with higher reliability comprises transmitting the subsequent data unit 10 using more reliable radio resources and/or more reliable radio mechanisms.

In examples, transmitting the subsequent data unit 10 using more reliable radio resources and/or more reliable radio mechanisms can be considered upgrading the radio resource(s) and/or radio mechanism(s) used to transmit the subsequent data unit 10.

In examples, radio resource and/or mechanism comprises at least one of: one or more data radio bearer; one or more radio link control (RLC) entities; one or more component carrier; a type of grant used; and/or duplication.

In the example of FIG. 5, the data unit B3 could be transmitted with higher reliability if data unit B2 is determined not to have arrived as expected. For example, the reliability target for data unit B3 could be upgraded.

In examples relating to third generation Partnership Project (3GPP), when at least one data unit 10 is determined not to have arrived as expected, the network system 11, which can be a NR or 5G RAN system, may upgrade the radio resource or reliability target for the next data unit 10.

This can, for example, enable prevention of a survival time failure by increasing the likelihood that he subsequent at least one data unit 10 is transmitted successfully across the at least one network system 11 to prevent consecutive failure of data unit(s) 10.

In examples, one or more of the following can be used:

The service data adaptation protocol (SDAP) layer of NR or 5G RAN may map the next data unit 10 to an alternative data radio bearer (DRB) having an associated higher reliability target;

The PDCP layer of NR or 5G RAN may conduct PDCP duplication for PDCP PDU for the next data unit 10;

The PDCP layer of NR or 5G RAN may submit the PDCP PDU for the next data unit 10 to a RLC entity whose logical channel (LCH) mapping is restricted to higher reliability radio resources. For example, grants with lower modulation and coding scheme (MCS), higher number of repetitions, higher transmission power, and/or serving cells with better channel quality;

The PDCP layer of NR or 5G RAN may submit the PDCP PDU for the next data unit 10 to a RLC entity whose LCH has a different set of logical channel prioritization (LCP) settings. For example, higher LCH priority and/or higher prioritized bit rate (PBR);

The PDCP may instruct radio resource control (RRC)/medium access control (MAC) to re-configure the radio resource, for example configured grant (CG)/semi-persistent scheduling (SPS) allocated for the traffic flow, for example TSC traffic flow, at least temporarily.

In some examples, method 200 comprises receiving information for configuring an apparatus, such as a network node performing method 200, to transmit, with higher reliability, over the network system 11, the received expected data unit 11 subsequent to the expected data unit 10 determined not to have arrived for transmission over the at least one network system 11 as expected.

For example, a gNB can transmit one or more signals 16 to a UE, the one or more signals 16 comprising the information to configure the UE. See, for example, FIG. 4.

Examples of the disclosure are advantageous. For example, examples of the disclosure enable an improvement in transmission reliability of one or more data units adjacent one or more missing and/or corrupted data units 10, which, for example, decreases the probability of consecutive failed data units 10.

Examples of the disclosure decrease likelihood or probability of consecutive data unit 10 failure which can, for example, prevent violation of one or more communication requirements, such as a survival time violation.

Additionally, or alternatively, examples of the disclosure decrease likelihood or probability that the number of consecutive failed data units 10 exceed a limit. This can, for example, prevent violation of one or more communication requirements, such as violation of a survival time.

Figure 3:
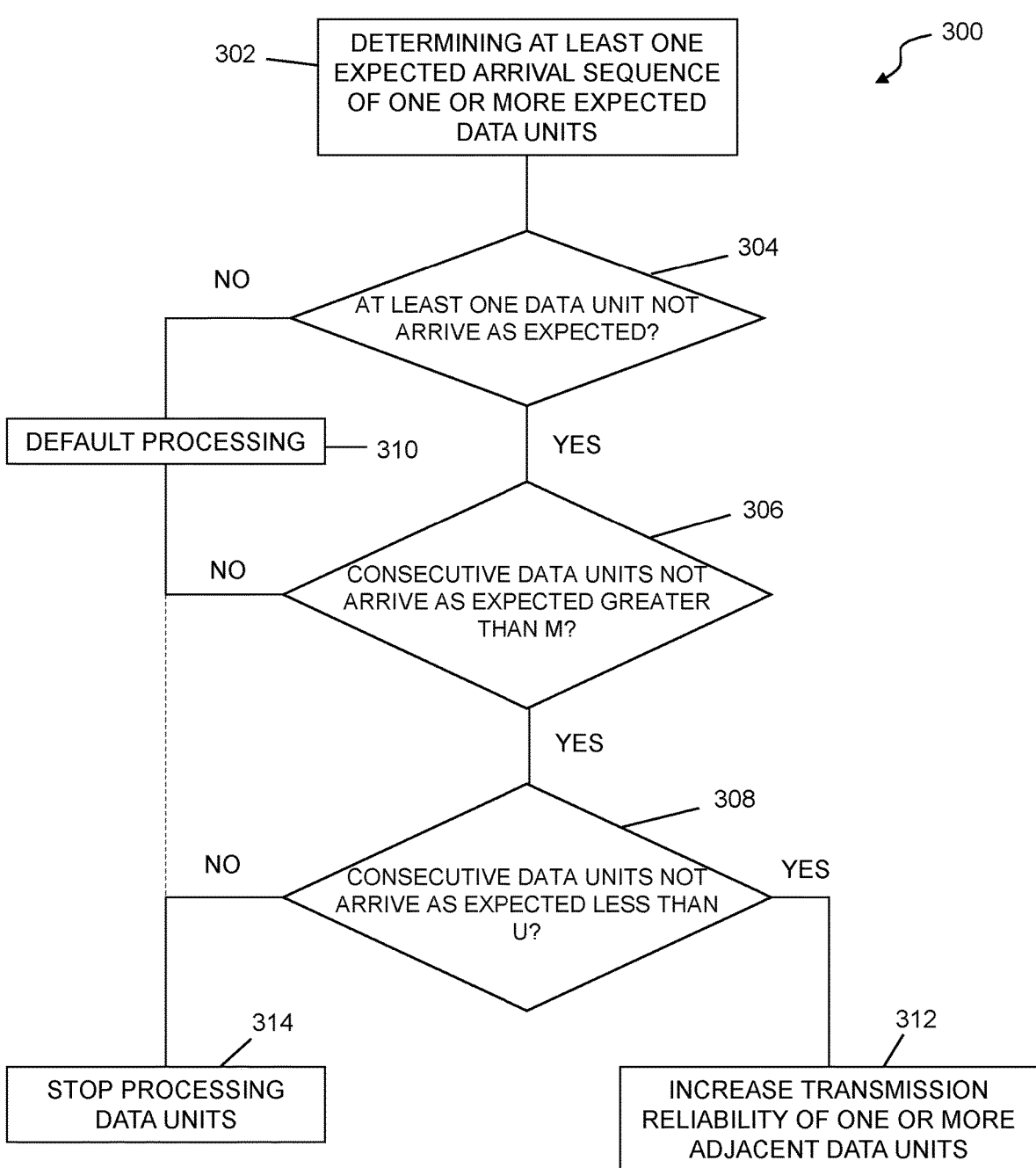
FIG. 3 shows another example of the subject matter described herein.

FIG. 3 illustrates an example of a method 300.

In examples, the method 300 can be performed by any suitable apparatus comprising any suitable means for performing the method 300. For example, an apparatus 130 as described in relation to FIGS. 6A and/or 6B.

In examples, the method 300 can be performed by a terminal node 110, such as a UE and/or an access node 120, such as a gNB. See, for example, FIG. 4.

In examples, method 300 can be considered an extension and/or variation of the method 200 of FIG. 2.

At block 302, the method 300 comprises determining at least one arrival sequence of one or more expected data units 10 to be transmitted over at least one network system 11.

In examples, block 302 can be as described in relation to block 202 of FIG. 2.

At block 304, the method 300 comprises determining if at least one of the one or more expected data units 10 does not arrive for transmission over the at least one network system 11 as expected.

In examples, block 304 can be as described in relation to block 204 of FIG. 2.

If it is determined, at block 304, that expected data unit(s) 10 have arrived for transmission over the at least one network as expected, the method 300 proceeds to block 310 and received expected data unit(s) 10 are transmitted over the at least one network system 11 as normal.

If it is determined, at block 304, that at least one of the one or more expected data units 10 does not arrive for transmission over the at least one network system 11 as expected, the method 300 proceeds to block 306.

At block 306, the method 300 comprises determining if the number of consecutive data units 10 that have not arrived for transmission over the at least one network system 11 as expected is greater than a lower limit, M.

Accordingly, in examples, the method 300 comprises determining a number, N, of consecutive expected data units 10 that have not arrived for transmission over the at least one network system 11 as expected.

Any suitable method for determining a number, N, of consecutive expected data units 10 that have not arrived for transmission over the at least one network system 11 as expected can be used.

In examples, a counter can be used to count the number of consecutive expected data units 10 that do not arrive as expected as described in relation to block 204.

Any suitable value of the lower limit, M, can be used. In some examples, the lower limit, M, can be determined based, at least in part, on one or more applications associated with the expected data unit(s) 10.

For example, the lower limit, M, can be determined based, at least in part, on the number of consecutive missing data units 10 that will cause a survival time violation at one or more applications associated with the expected data unit(s) 10.

In examples, the value of M can be in the range 0 to 10, and/or in the range 1 to 10 and/or in the range 3 to 7 and/or in the range 4 to 6 and/or in the range 0 to 3 and/or in the range 1 to 2.

In some examples, the value of M can be received. Accordingly, in examples, method 300 comprises receiving the value of M. For example, method 300 can comprise receiving one or more signals 16 comprising the value of M. See, for example, FIG. 4.

If it is determined, at block 306, that the number of consecutive data units 10 that have not arrived for transmission over the at least one network system 11 as expected is not greater than a lower limit, M, the method proceeds to block 310.

If it is determined, at block 306, that the number of consecutive data units 10 that have not arrived for transmission over the at least one network system 11 as expected is greater than the lower limit, M, the method 300 proceeds to block 308.

At block 308, the method 300 comprises determining if the number of consecutive data units 10 that have not arrived for transmission over that at least one network 11 as expected is greater than an upper limit, U.

Any suitable value of the upper limit, U, can be used. In some examples, the upper limit, U, can be determined based, at least in part, on one or more applications associated with the expected data unit(s) 10.

For example, the upper limit, U, can be determined based, at least in part, on the number of consecutive missing data units 10 that will cause a survival time violation at one or more applications associated with the expected data unit(s) 10.

In examples, the value of U can be in the range 0 to 10, and/or in the range 1 to 10 and/or in the range 3 to 7 and/or in the range 4 to 6 and/or in the range 0 to 3 and/or in the range 2 to 3.

In some examples, the value of U can be received. Accordingly, in examples, method 300 comprises receiving the value of U. For example, method 300 can comprise receiving one or more signals 16 comprising the value of U. See, for example, FIG. 4.

If it is determined, at block 308, that the number of consecutive data units 10 that have not arrived for transmission over at least one network 11 as expected is less than the upper limit U, the method 300 proceeds to block 312.

At block 312, the method 300 comprises increasing transmission reliability of one or more data units 10 adjacent to at least one expected data unit 10 that has not arrived for transmission over the at least one network system 11 as expected.

In examples, block 312 can be as described in relation to block 206 of FIG. 2.

For example, increasing transmission reliability at block 312 can be as described in relation to block 206 of FIG. 2.

In examples, one or more of blocks 306 and 308 can be omitted.

For example, if block 308 is omitted, the 'yes' path out of block 306 can proceed to block 312. In such examples, block 314 would be omitted.

Accordingly, in some examples, method 300 comprises determining a number, N, of consecutive expected data units 10 that have not arrived for transmission over the at least one network system 11 as expected; and at least one of:

increasing transmission reliability of one or more data units 10 adjacent to at least one expected data unit 10 that has not arrived for transmission over the at least one network system 11 as expected, if N is less than an upper limit; and increasing transmission reliability of one or more data units 10 adjacent to at least one expected data unit 10 that has not arrived for transmission over the at least one network system 11 as expected, if N is greater than a lower limit.

As previously noted, in examples, the method 300 comprises receiving at least one upper limit value and/or at least one lower limit value.

In some examples, increasing transmission reliability of one or more data units 10, at block 312, comprises increasing transmission reliability of one or more data units 10 based, at least in part, on N.

In examples, method 300 comprises determining one or more actions to perform to increase transmission reliability of one or more data units 10 based, at least in part, on N.

Additionally, or alternatively, method 300 comprises determining a number of actions to perform to increase transmission reliability of one or more data units 10 based, at least in part, on N.

For example, if one data unit 10 is determined not to arrive as expected and survival time for an associated application defines 3 consecutive errors, increasing transmission reliability may take one of the actions described in relation to block 206 and/or increase transmission reliability of a subsequent data unit 10 from packet error rate (PER) $PER=10^{-3}$ to $PER=10^{-4}$.

However, if there are two data units 10 determined not to have arrived as expected, increasing transmission reliability may take two action described in relation to block 206 and/or increase transmission reliability of a subsequent data unit 10 from $PER=10^{-3}$ to $PER=10^{-6}$.

If it is determined, at block 308, that the number of consecutive data units 10 that have not arrived for transmission over the at least one network 11 as expected is greater than the upper limit, U, method 300 proceeds to block 314.

At block 314, the method 300 comprises stopping processing of received expected data units 10.

In examples, when the number of consecutive data units 10 that have not arrived as expected is greater than U, an unavoidable error, such as survival time violation, has, in examples, already occurred and therefore the method 300 may cause a stopping of processing of data units 10.

In some examples, at block 314, method 300 comprises informing the upper layer that expected quality of service (QoS) cannot be met.

In examples, method 300 comprises receiving one or more signals 16 to configure behavior at block 314.

In some examples, if it is determined, at block 308, that the number of consecutive data units 10 that have not arrived for transmission over the at least one network 11 as expected is greater than the upper limit, U, method 300 proceeds to block 310.

FIG. 4 illustrates an example scenario.

In the example of FIG. 4, a UE 18 and a gNB 20 are part of a network, for example, a network 100 as described in relation to FIG. 1. However, in examples, the UE 18 and gNB 20 can be and/or comprise any suitable network node(s).

In the example of FIG. 4, the UE 18 and gNB 20 can be considered to form at least part of a network system 11. In the illustrated example, the network system 11 comprises a NR or 5G RAN system.

In FIG. 4, the UE 18 is configured to perform at least part of a method as described herein. For example, a method as described in relation to FIG. 2 and/or FIG. 3.

In the example of FIG. 4, the UE 18 receives one or more data units 10. This is illustrated by the arrow 406 pointing at block 400 indicating receiving one or more data units 10. In FIG. 4, the one or more data units 10 are in the form of one or more signals 16 and arrive at the UE 18 as indicated by the arrow 406.

Reference numeral 16 is used herein to indicate, generally, one or more signals. The one or more signals indicated at different points by reference numeral 16 can be unrelated and can comprise different information.

At block 400, the UE 18 performs method 200 and/or method 300 as described in relation to FIG. 2 and/or FIG. 3 for expected data units 10 and received data units 10, as indicated by arrow 406.

In the example of FIG. 4, one or more elements and/or one or more actions of the method performed at the UE 18 is configured by the gNB 20.

In FIG. 4 this is done by the transmission and corresponding reception of one or more signals 16.

For example, one or more signals 16 can be transmitted from the gNB 20 to UE 18 prior to block 400, as indicated by arrow 402, and/or one or more signals 16 transmitted from the gNB 20 to UE 18 as part of block 400, as indicated by arrow 404.

The one or more signals 16 transmitted from the gNB 20 to UE 18 comprise configuration information 22 to configure one or more elements and/or one or more actions of the method performed at the UE 18.

It should be understood that for any transmitting action, FIG. 4 also illustrates a corresponding receiving action.

Additionally, or alternatively, one or more signals 16 can be communicated between the UE 18 and gNB 20 as part of block 400, as indicated by arrow 404.

In examples, one or more signals 16 can be transmitted from the UE 18 to the gNB 20 prior to and/or during block 400. Arrows 402 and 404 are therefore illustrated as double-headed arrows.

Any suitable element(s) and/or action(s) at the UE 18 can be configured by the gNB 20.

For example, the one or more signals 16, received at 402 and/or 404, can comprise configuration information 22 to configure one or more of:

at least one value for a time period 12 for use in determining if a data unit 10 has arrived as expected (see, for example, block 204);

at least one upper limit value, U;

at least one lower limit value, M;

behavior when block 308 is determined to be positive;

behavior when it is determined that at least one data unit 10 has not arrived as expected;

configuration information to increase transmission reliability; and so on.

In examples, the gNB 20 may trigger uplink (UL) RRC/MAC reconfiguration for subsequent data unit 10, for example data unit B3 in FIG. 5 if data unit B2 is missing, in UL after reception of redundant preceding data unit 10, for example data unit B1 in FIG. 5, in different time instance.

In examples, receipt of repeated/redundant data unit 10 can be considered an implicit signaling to inform the gNB 20 (or other network node in other examples) of a data unit 10 determined not to have arrived as expected.

In examples, UE 18 may be configured with different configurations (for example, PDCP duplication, logical channel mapping, and/or different CG and so on) for default and special handling of data units 10.

The corresponding configuration may be used in both gNB 20 and UE 18 depending on whether a repeated/redundant preceding data unit 10 is transmitted/received or not.

In examples, gNB 20 can be configured to perform and/or can perform at least part of a method described herein. For example, at least part of method 200 of FIG. 2 and/or at least part of method 300 of FIG. 3.

As FIG. 4 illustrates one or more actions of transmission of at least one signal 16, FIG. 4 also illustrates the corresponding transmitting/causing transmission feature(s)/action(s).

Similarly, for any transmitting/causing transmission feature(s)/action(s), FIG. 4 also illustrates the corresponding receiving/causing receiving feature(s)/action(s).

Furthermore, for any receiving/causing reception feature(s)/action(s), FIG. 4 also illustrates the corresponding transmitting/causing transmission feature(s)/action(s).

Examples of the disclosure are advantageous.

For example, examples of the disclosure enable prevention of consecutive missing and/or lost and/or corrupted data units 10 leading to a communication failure.

FIG. 6A illustrates an example of an apparatus 130. The apparatus 130 may be a controller of an apparatus or device such as a terminal node 110, for example UE 18, or an access node 120, such as a gNB 20.

Implementation of apparatus 130 may be as controller circuitry. The apparatus 130 may be implemented in hardware alone, have certain aspects in software including firmware alone or can be a combination of hardware and software (including firmware).

As illustrated in FIG. 6A the apparatus 130 may be implemented using instructions that enable hardware functionality, for example, by using executable instructions of a computer program 136 in a general-purpose or special-purpose processor 132 that may be stored on a computer readable storage medium (disk, memory etc.) to be executed by such a processor 132.

The processor 132 is configured to read from and write to the memory 134. The processor 132 may also comprise an output interface via which data and/or commands are output by the processor 132 and an input interface via which data and/or commands are input to the processor 132.

The memory 134 stores a computer program 136 comprising computer program instructions (computer program code) that controls the operation of the apparatus 130 when loaded into the processor 132. The computer program instructions, of the computer program 136, provide the logic and routines that enables the apparatus 130 to perform at least a portion of the methods illustrated in FIGS. 2 and/or 3 and/or 4. The processor 132 by reading the memory 134 is able to load and execute the computer program 136.

In examples, the apparatus 130 therefore comprises:

at least one processor 132; and at least one memory 134 including computer program code the at least one memory 134 and the computer program code configured to, with the at least one processor 132, cause the apparatus 130 at least to perform:

determining at least one expected arrival sequence of one or more expected data units to be transmitted over at least one network system;

determining if at least one of the one or more expected data units does not arrive for transmission over the at least one network system as expected; and if it is determined that at least one of the one or more expected data units does not arrive for transmission over the at least one network system as expected, increasing transmission reliability of one or more data units adjacent to at least one expected data unit that has not arrived for transmission over the at least one network system as expected.

As illustrated in FIG. 6A, the computer program 136 may arrive at the apparatus 130 via any suitable delivery mechanism 162. The delivery mechanism 162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 136. The delivery mechanism may be a signal configured to reliably transfer the computer program 136. The apparatus 130 may propagate or transmit the computer program 136 as a computer data signal.

Computer program instructions for causing an apparatus to perform at least the following or for performing at least the following:

determining at least one expected arrival sequence of one or more expected data units to be transmitted over at least one network system;

determining if at least one of the one or more expected data units does not arrive for transmission over the at least one network system as expected; and if it is determined that at least one of the one or more expected data units does not arrive for transmission over the at least one network system as expected, increasing transmission reliability of one or more data units adjacent to at least one expected data unit that has not arrived for transmission over the at least one network system as expected.

The computer program instructions may be comprised in a computer program, a non-transitory computer readable medium, a computer program product, a machine readable medium. In some but not necessarily all examples, the computer program instructions may be distributed over more than one computer program.

Although the memory 134 is illustrated as a single component/circuitry it may be implemented as one or more separate components/circuitry some or all of which may be integrated/removable and/or may provide permanent/semi-permanent/dynamic/cached storage.

In examples the memory 134 comprises a random access memory 158 and a read only memory 160. In examples the computer program 136 can be stored in the read only memory 160. See, for example, FIG. 6B In some examples the memory 134 can be split into random access memory 158 and read only memory 160.

Although the processor 132 is illustrated as a single component/circuitry it may be implemented as one or more separate components/circuitry some or all of which may be integrated/removable. The processor 132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 3 and/or 4 may represent steps in a method and/or sections of code in the computer program 136. The illustration of a particular order to the blocks does not necessarily imply that there is a required or preferred order for the blocks and the order and arrangement of the block may be varied. Furthermore, it may be possible for some blocks to be omitted.

For example, block 306 and/or block 308 of FIG. 3 can be omitted.

Where a structural feature has been described, it may be replaced by means for performing one or more of the functions of the structural feature whether that function or those functions are explicitly or implicitly described.

Thus, the apparatus 130 can, in examples, comprise means for:

determining at least one expected arrival sequence of one or more expected data units to be transmitted over at least one network system;

determining if at least one of the one or more expected data units does not arrive for transmission over the at least one network system as expected; and if it is determined that at least one of the one or more expected data units does not arrive for transmission over the at least one network system as expected, increasing transmission reliability of one or more data units adjacent to at least one expected data unit that has not arrived for transmission over the at least one network system as expected.

In examples, an apparatus 130 can be configured to perform one or more methods, or at least part of one or more methods, as disclosed herein.

Where one or more elements are described as being 'for' an action or actions, the one or more elements should also be considered to be configured to perform that action or actions. For example, an element for transmitting, should also be considered an element configured to transmit and vice versa.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
at least one processor; and at least one memory including computer program code, the at least one memory and computer program code configured to, with the at least one processor, cause the apparatus to at least perform:
determining at least one expected arrival sequence of one or more expected data units to be transmitted over at least one network system;
determining if at least one of the one or more expected data units does not arrive for transmission over the at least one network system as expected;
if it is determined that at least one of the one or more expected data units does not arrive for transmission over the at least one network system as expected, increasing transmission reliability of one or more data units adjacent to at least one expected data unit that has not arrived for transmission over the at least one network system as expected,
wherein determining if at least one of the one or more expected data units does not arrive for transmission over the at least one network system as expected comprises:
determining if at least one of the one or more expected data units does not arrive within a time period of an associated expected arrival time; and
receiving one or more signals comprising information to notify that at least one of the one or more expected data units will not arrive for transmission over the at least one network system as expected; and
determining if at least one of the one or more expected data units has been received incorrectly;
determine a number, N, of consecutive expected data units that have not arrived for transmission over the at least one network system as expected; and to:
increase transmission reliability of one or more data units adjacent to at least one expected data unit that has not arrived for transmission over the at least one network system as expected, if N is less than an upper limit; and
increase transmission reliability of one or more data units adjacent to at least one expected data unit that has not arrived for transmission over the at least one network system as expected, if N is greater than a lower limit; and
receive at least one value for the time period to be used in determining if at least one of the one or more expected data units does not arrive for transmission over the at least one network system as expected,
wherein increasing transmission reliability of one or more data units adjacent to at least one expected data unit that has not arrived for transmission over the at least one network system as expected comprises:
retransmitting, over the network system, a received expected data unit preceding an expected data unit of the one or more expected data units determined not to have arrived for transmission over the at least one network system as expected, wherein retransmitting the preceding data unit comprises a Packet Data Convergence Protocol (PDCP) layer submitting to a lower layer a stored copy of a PDCP Packet Data Unit (PDU) of the preceding data unit; and transmitting with higher reliability, over the network system, a received expected data unit subsequent to an expected data unit one or more expected data units determined not to have arrived for transmission over the at least one network system as expected, wherein transmitting with higher reliability comprises transmitting the subsequent data unit using more reliable radio resources and more reliable radio mechanisms, wherein the more reliable radio resources comprise:

a lower modulation and coding scheme, a higher number of repetitions, higher transmission power, and a serving cell with better channel quality, wherein transmitting with higher reliability further comprises performing PDCP duplication of a PDCP PDU for the received expected data unit subsequent to the expected data unit determined not to have arrived, and wherein the radio resources and the radio mechanisms comprise:

one or more data radio bearer;

one or more component carrier;

one or more radio link control entities;

a type of grant used; and duplication.

* * * * *